United States Patent [19]

Mach

[11] 3,963,416
[45] June 15, 1976

[54] FURNACE EXHAUST SYSTEM

[75] Inventor: Vlastimil Frank Mach, Coon Rapids, Minn.

[73] Assignee: General Resource Corporation, Hopkins, Minn.

[22] Filed: June 19, 1975

[21] Appl. No.: 588,189

[52] U.S. Cl. .................................. 432/64; 432/115; 432/72; 98/115 R; 266/145; 34/86; 266/155
[51] Int. Cl.² ........................ F24F 9/00; F27D 7/00
[58] Field of Search .............. 432/64, 72, 103, 105, 432/107, 113, 115, 116; 110/179; 98/115 R, 115 LH; 266/15, 16; 34/35, 86

[56] References Cited
UNITED STATES PATENTS

| | | | |
|---|---|---|---|
| 3,347,539 | 10/1967 | Mitchell et al. | 266/15 |
| 3,708,414 | 1/1973 | Laube | 432/64 |
| 3,749,382 | 7/1973 | Thompson | 432/105 |
| 3,917,444 | 11/1975 | Carthew | 432/72 |

*Primary Examiner*—John J. Camby
*Assistant Examiner*—Henry C. Yuen
*Attorney, Agent, or Firm*—Paul L. Sjoquist

[57] ABSTRACT

Apparatus is disclosed for attachment adjacent an open end of a rotary furnace, having a first effluent furnace gas exhaust duct projecting into the furnace and a dust collecting hood adjacent the furnace opening. A pressurized air duct plenum having a plurality of air jet holes directs a curtain of air across the furnace open end, and a receiving air duct plenum having a plurality of openings collects the air curtain for exhausting via a filter system. The hot effluent furnace gas is passed through a gas to gas heat exchanger and to the aforementioned filter system.

15 Claims, 5 Drawing Figures

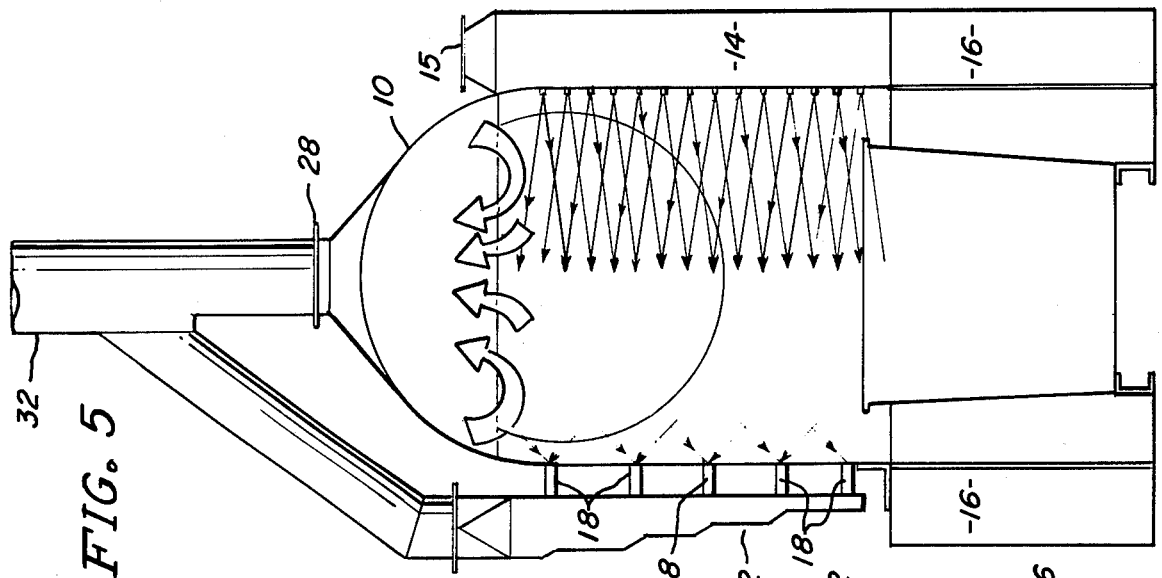
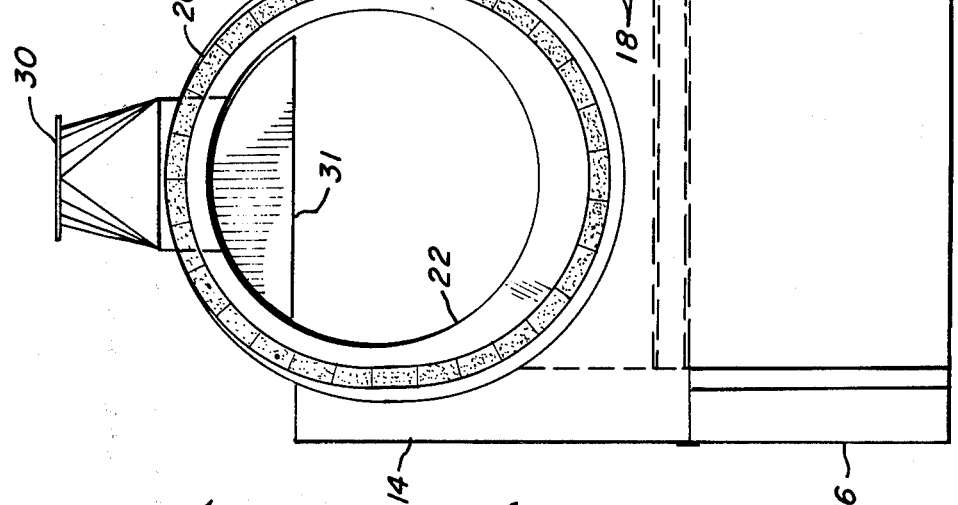
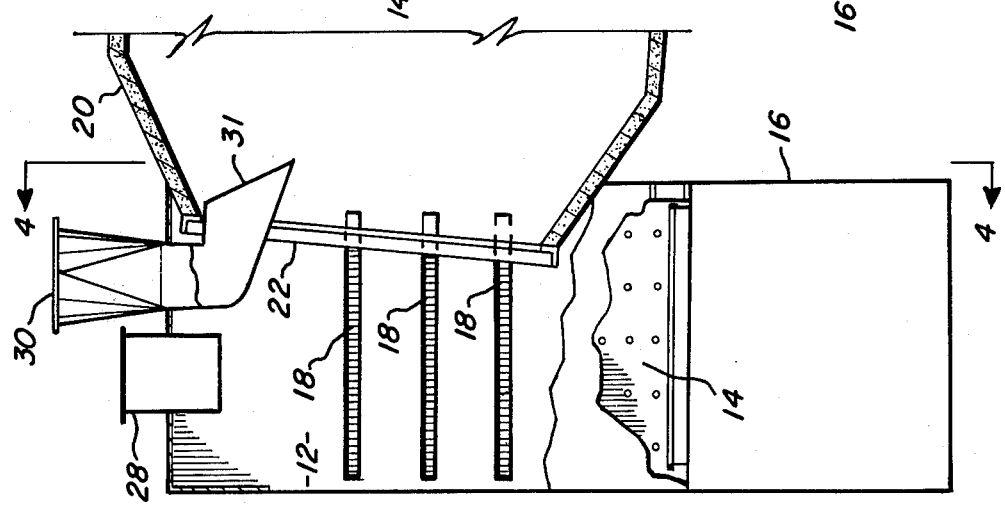

FURNACE EXHAUST SYSTEM

BACKGROUND OF THE INVENTION

This invention relates to an apparatus for simultaneously exhausting hot furnace gases, recovering heat from such gases, removing pollutants from such gases, protecting against excessive heat radiation from a furnace, and removing dust laden air from the region around a furnace opening. The apparatus is preferably used in conjunction with a rotary furnace of a type commonly used in industrial applications. Such a furnace typically is rotatably mounted, and has an open hearth exposed to the atmosphere. The gases generated within such a furnace from the burning process contain a significant quantity of pollutants, and the region around the open furnace end is typically exposed to high heat radiation and becomes heavily dust laden when charging or cleaning the furnace. These conditions create a hazardous work area and require special precautions in order to provide an environment which is suitable for workmen.

The problem of removing hot exhaust gases from such a furnace is further complicated by the fact that the furnace is movable, thus preventing a sealed exhaust coupling from being made to the furnace. The problem of removing dust-laden air from the region in front of the open furnace is complicated by the fact that this region must be kept open for access to the interior. For this reason, the dust removal equipment must not interfere with the normal use and operation of the furnace opening.

Although the function of exhausting hot furnace gases and the function of removing heavily dust-laden air from the furnace work area both have the common essential intermediate step of filtering particulate matter and pollutants from the gas, it is not desirable to combine the two functions directly into a single exhaust system. Hot furnace gases are typically exhausted from the furnace at temperatures ranging from 1200° F – 1700° F, while dust-laden air from the region around a furnace opening is at temperatures ranging from 100° – 150° F. If these two temperature-divergent gases were to be mixed together and exhausted the resultant mixture would range from 600° F – 800° F. This temperature range exceeds the capability of filtration systems having fabric filters, which usually have an upper temperature operating limit of about 500° F, which means that the mixture must be cooled before being fed into a fabric filter.

The accepted approach to cooling hot gases is to provide a gas-to-gas heat exchanger of a capacity suitable for handling the temperature and flow rate characteristics of the gas. Since the heat exchanger must be inserted into the flow path of the gas mixture ahead of the filtration system, the heat exchanger must be sized for the combined volumetric flow rate of the gases comprising the mixture, even though the original hot furnace gases are the only component requiring cooling. Thus, the use of a single exhaust system increases the size and cost of the heat exchanger due to the increased volumetric flow rate requirements. Furthermore, since the temperature range of the mixture is lowered, the efficiency of a heat exchanger in recovering hot furnace gas heat is also lowered, and the amount of recovered heat which can be usefully transferred for other industrial applications is reduced.

A preferable solution to the problem, which is provided by the present invention, is to separate the two gas flow components until after the hot gases have been cooled, and then combine them for filtration. This solution offers an additional benefit in that the cooling of a smaller volume of gas at a higher initial temperature can be done more efficiently and the recovered heat can therefore be more useful, either for preheating the input furnace air or for providing supplementary heating to some other industrial process. Gas to gas heat exchangers are readily available in the industrial field for accepting the required volume of gas at a temperature of 1200° F – 1700° F and for reducing the output gas temperature to below 500° F. These heat exchangers transfer the heat from the furnace gases to clean air, and the air at an elevated temperature is useful as a preheated furnace input air supply.

The key to solving the foregoing problem in the manner described lies in the design of a suitable hood for the furnace end opening—one which brings the captured hot furnace gases into the exhaust system, and which also captures the dust-laden air from the region surrounding the furnace opening, but which maintains an isolation between the respective gas/air flow paths until after the gases have been cooled. The present invention accomplishes this result through the apparatus disclosed herein.

Prior art devices have utilized the various approaches to solving the problem of collecting pollutants and gas from such furnaces. For example, U.S. Pat. No. 3,822,872, issued July 9, 1974, discloses a furnace fume collector which is movable with the furnace itself. The apparatus disclosed utilizes telescoping and movable duct work for transporting fumes from the furnace in any of a number of furnace positions. U.S. Pat. No. 3,215,425, issued Nov. 2, 1965, discloses a movable seal which clamps around the furnace collar for purposes of capturing furnace gases emitted from the furnace opening. The seal may be disengaged whenever the furnace is moved from its resting position.

SUMMARY OF THE INVENTION

The present invention comprises an inverted U-shaped hood which is mounted over the furnace opening; a plurality of pressurized air jets are provided along one leg of the hood and directed toward the other leg; a plurality of slots are positioned opposite the air jets for creating an air curtain therebetween; and suitable ducting is provided to each of the legs of the hooded member. A furnace exhaust gas duct extends downwardly from the hood and into the furnace opening for the collection of hot furnace gases. The hood opens into a second cold exhaust duct which also communicates with the slots positioned along one U-leg. The cold exhaust duct is piped to a suitable filter apparatus, while the hot exhaust duct is piped to the same apparatus after first being channeled through a heat exchanger for transfer of the hot temperatures from the gases. The heat exchanger converts cold ambient air into hot ambient air in the heat exchanger and suitable ducting is provided to feed this high temperature air back into the furnace to aid in the burning process, or it can be ducted elsewhere for some other purpose. The cooled exhaust gas emitted from the heat exchanger is coupled into the same line as the cold exhaust duct from the furnace, and both are transmitted to a suitable filter assembly. Thus, the cold dust-laden air is not combined with the hot furnace exhaust gases until after the heat has been removed from hot exhaust gases. The configuration allows the heat exchanger to operate with maximum efficiency at minimum volume air flow requirements, and also enables the filtering apparatus to handle only cooled gases and air.

BRIEF DESCRIPTION OF THE DRAWINGS

A preferred embodiment of the present invention is illustrated in the drawings, in which:

FIG. 3 is a side view, in partial cross section, of the invention;

FIG. 4 is a view of the invention taken along the lines 4—4 of FIG. 3; and

FIG. 5 is an outside end view of the invention.

DETAILED DESCRIPTION OF THE INVENTION

Figure 1:
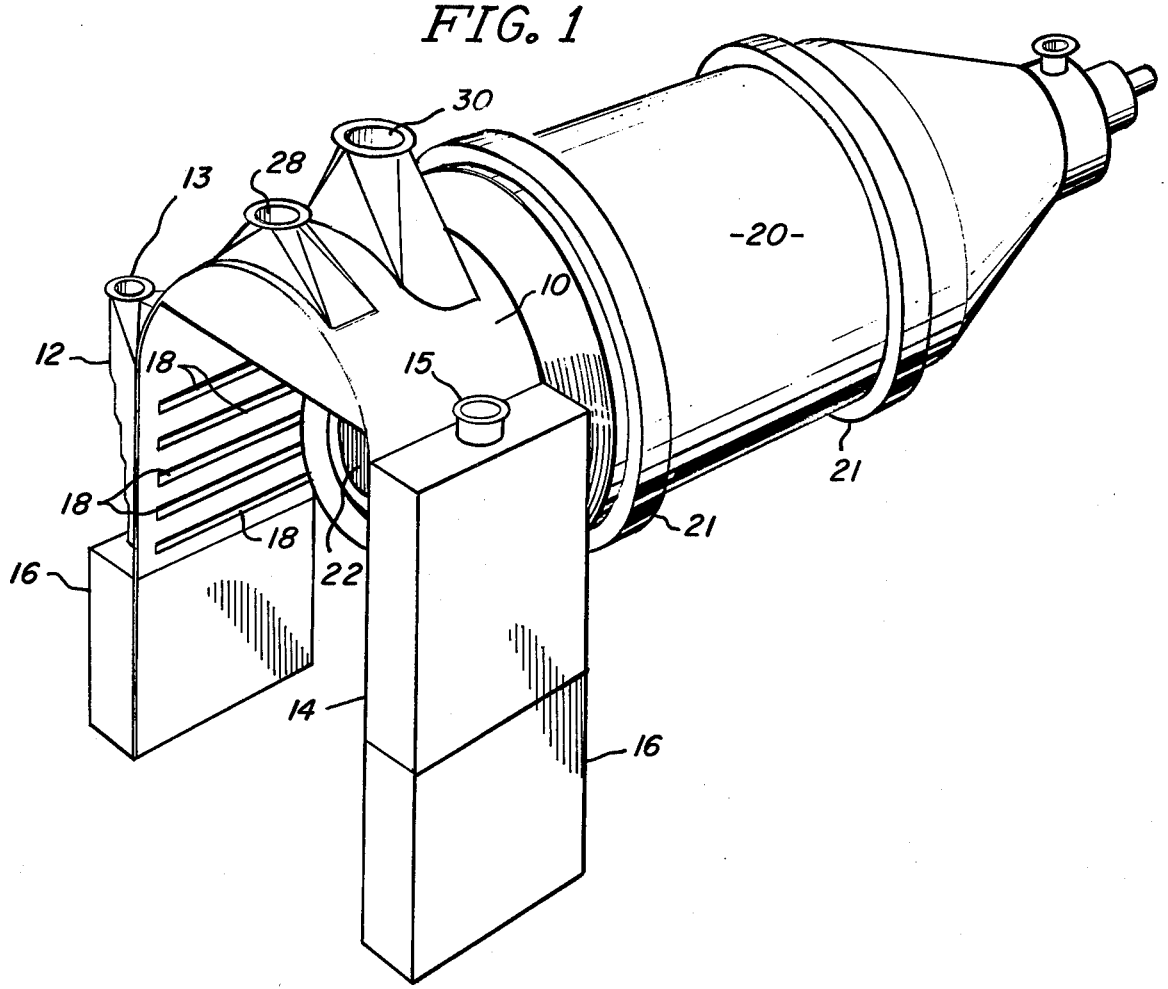
FIG. 1 is an isometric view of the invention positioned adjacent a furnace.

Referring first to FIG. 1, the invention is shown in isometric view adjacent the open end of a rotary furnace 20. A curved hood 10 is mounted adjacent the furnace open end and is connected to a slotted duct 12 and an air jet duct 14. The slotted duct 12 and the air jet duct 14 are supported by concrete block bases 16. Air jet duct 14 has an inlet 15 for feeding pressurized air into the duct. Slotted duct 12 has an outlet 13 for exhausting air received through a plurality of slots 18. Hood 10 has a first exhaust outlet 28 for removing cold exhaust gases from the region in front of furnace opening 22. Hood 10 has a second hot gas exhaust outlet 30 for removing hot furnace gases from furnace opening 22. Exhaust outlet 28 opens into the underside of hood 10, whereas hot gas outlet 30 forms a part of a duct which opens into the interior of furnace 20, in a region near furnace opening 22. Rotary furnace 20 is typically mounted on a bearing surface 21 for rotation about its elongated axis, and the hot gas duct associated with outlet 30 protrudes into the interior of the furnace without contacting any part of the rotating furnace.

Figure 2:
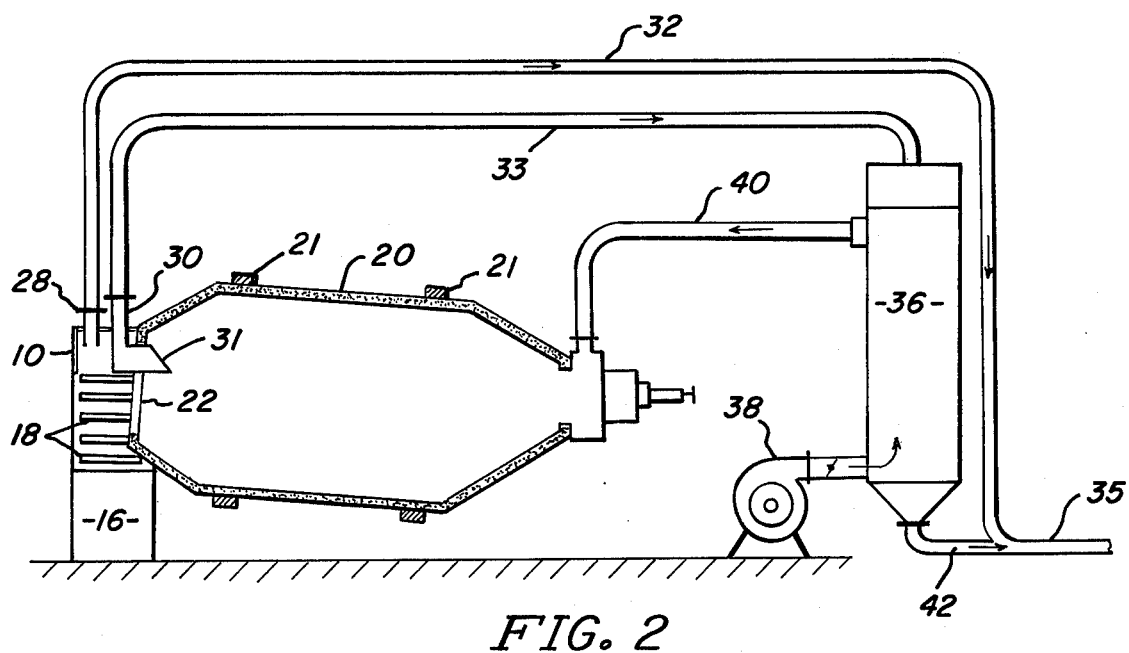
FIG. 2 is a schematic illustration of the gas flow paths.

FIG. 2 diagrammatically illustrates the interconnection of the various exhaust gas removal components of the invention. Cold exhaust gas is fed from exhaust outlets 28 and 13 through a cold gas duct 32 to connect with a main filter duct 35. Filter duct 35 feeds into a filtration system, such as a fabric bag filter system, of a type commonly known in the art for such applications. Hot gas outlet 30 is connected to a hot gas pipe 33 and fed into heat exchanger 36. Heat exchanger 36 may be a gas to gas heat exchanging device as known in the art, which accepts hot flue gas at one of its inlets and cold clean air at a second of its inlets, and causes the clean air to be heated through heat transfer from the hot polluted gas and the gas thereby becomes cooled at its outlet from the heat exchanger. Blower 38 supplies clean cold air to a heat exchanger inlet and outlet pipe 40 feeds the clean air, after heating in the exchanger, back to furnace 20. Outlet 42 transfers the cooled polluted furnace gas to the main filter duct 35 for subsequent treatment in a filter system as hereinbefore described. In the example of FIG. 2, outlet pipe 40 conveys the heated air back to furnace 20 for preheating the furnace air supply and thereby improving the efficiency of furnace operation. In other examples, the outlet pipe 40 could be used to provide heated air to any industrial process or heating operation. It should be noted from FIG. 2 that, whereas exhaust outlet 28 opens into the underside of hood 10, hot gas outlet 30 is connected to a gas inlet 31 which projects into the interior of furnace 20 and thereby collects hot gases from the region inside the furnace.

FIG. 3 shows a side view of the invention, in partial cross section and in cutaway. A slotted plenum 12 having a plurality of slots 18 is in facing relationship to an air jet plenum 14 having a plurality of air jet holes. Pressurized air is forced into air jet plenum 14, thereby causing a plurality of high pressure air jets to direct an air current across the region in front of furnace opening 22. This air jet curtain is accepted into the slots 18 and passed upwardly through an outlet 13 (FIG. 1) which is coupled to cold gas duct 32 (see FIG. 2). In a typical embodiment, slots 18 are approximately 2 inches wide and extend for nearly the entire width of plenum 12. The plurality of air jet holes found on air jet plenum 14 are typically 1 inch or less in diameter, and in a usual system there may be 50–60 of these holes arranged along the inwardly facing edge of air jet plenum 14. Pressurized fresh air is supplied to plenum 14 at a volumetric flow rate ranging from 500–1000 cubic feet per minute (cfm) to create discharge air velocities through the air jet holes equally and exceeding 2000 feet per minute (fpm). Under these circumstances the average air velocity flowing horizontally past the opening 22 of furnace 20 is in excess of 500 fpm, and a significant portion of this air curtain passes into slots 18. Air which does not pass into slots 18 is drawn upwardly into hood 10 and passes through exhaust outlet 28.

FIG. 4 illustrates a view of the invention taken along the lines 4—4 of FIG. 3. It can be seen that hot gas inlet 31 is shaped to fit the curvature of furnace opening 22 without actually contacting the furnace opening edge. Furnace 20 can therefore rotatably move without touching the curved portion of inlet 31, while inlet 31 functions to remove hot furnace gases from the furnace interior. FIG. 4 also illustrates the construction of slotted plenum 12, and its connection with outlet 13 to pass cold exhaust gases upwardly.

FIG. 5 illustrates diagrammatically the air flow path associated with air emitted from the air jets in plenum 14. These pressurized air jets create a curtain of air which moves horizontally across the open end of the furnace and into slots 18, which are coupled into plenum 12 for removal. A certain portion of the air emitted from the air jets is deflected upwardly into the region under hood 10, and this air is passed upwardly through exhaust outlet 28 into cold gas pipe 32. Slotted plenum 12 is also connected into cold gas pipe 32, so that the entire pressurized air supply provided to inlet 15 is conveyed through cold gas pipe 32, either via hood 10 and exhaust outlet 28, or plenum 12. In a typical embodiment of this system, cold gas pipe 32 may be 18 inches in diameter and carry a total volumetric air flow at about 7000 cfm, at temperatures ranging from 100° – 150° F.

In operation, the rotary furnace may be rotatably moved for any of the functions necessary for the use of the furnace without interference from the exhaust system. Furthermore, access to the furnace open end is possible because the exhaust system does not obstruct the furnace opening except to the minimum extent required by the projection of hot gas inlet 31 into the furnace interior. The hood 10 continues to function as a collector of dust and effluent gases whether the furnace is rotating or stationary, and the air curtain provided by plenums 12 and 14 also continues to operate under all furnace conditions. In addition to providing a dust collecting function, the air curtain also operates to shield workers from the intense heat radiation from within the furnace. Because the average volumetric air flow across the furnace open end is in excess of 500 fpm, this air flow conveys away most of the furnace heat which would otherwise be transferred out into the region around the furnace open end and would increase the hazard and discomfort associated with working near the furnace.

Of course, all of the exhaust ducts and conveyor pipes described herein may be equipped with damper mechanisms so as to adjust the relative air flow and pressure to maintain a proper balance throughout the system. For example, a damper may be placed in slotted plenum 12 or its exhaust pipe to regulate the relative flow rate into cold gas pipe 32, or a balancing damper may be placed above exhaust outlet 28 for a similar purpose. Likewise, the pressurized air supply into inlet 15 may be controlled by means of a suitable damper. Because the hot gas exhaust system typically conveys high temperature and corrosive gases it is preferably constructed from stainless steel. The cold gas system described herein may typically be constructed of lighter gauge and less corrosive resistant sheet metal.

Having thus described a preferred embodiment of the invention, it is apparent that modifications may be made thereto without departing from the essential teachings. For example, the number and size of the air jet holes, as well as their geometric configuration, may be varied so long as an air current is created between the air jet holes and the facing slots on plenum 12. The air flow rates in the cold exhaust system are selected so that there is a net suction through cold gas pipe 32 to tend to draw into hood 10 the ambient dust and air from the region in front of furnace 20, and to thereby keep this region free from dust and pollutants.

What is claimed is:

1. A dust and effluent gas removal system for use with an open end rotary furnace, comprising:
   a. a dust collection hood positioned adjacent the furnace open end;
   b. a pressurized air duct, including a plurality of air jet holes, positioned adjacent the furnace open end and beneath the dust collection hood;
   c. an air receiving duct, including a plurality of air receiving openings in facing relationship to said air jet holes, positioned adjacent the furnace open end and beneath the dust collection hood;
   d. means for connecting the air receiving duct to the dust collection hood; and
   e. an effluent gas removal duct having a first end protruding into said furnace open end and having a second end passing through said dust collection hood.

2. The apparatus of claim 1 wherein said effluent gas removal duct further comprises a first surface complementary shaped to a portion of said furnace open end and positioned in non-contacting but adjacent relationship thereto.

3. The apparatus of claim 2, wherein said air jet holes are geometrically arranged over a portion of said pressurized air duct at least extending across the width of the furnace open end.

4. The apparatus of claim 3 wherein said pressurized air duct and said air receiving duct each extend outwardly parallel to said furnace.

5. The apparatus of claim 4 wherein said air jet holes comprise at least fifty in number.

6. The apparatus of claim 5, further comprising means for cooling said effluent gas, connected to said effluent gas removal duct.

7. The apparatus of claim 6, further comprising means for filtering particulate matter from a gas, said means connected to said means for cooling said effluent gas and to said means for connecting the air receiving duct to the dust collection hood.

8. A dust and effluent gas exhaust system for an open-ended rotary furnace, comprising:
   a. a downwardly curved hood mounted adjacent the furnace open end, and having a first outlet therefrom in communication with the interior of the downwardly curved portion, and having a second effluent gas outlet therefrom;
   b. an effluent gas duct connected to said second effluent gas outlet, said duct projecting into the interior of said furnace;
   c. first and second air plenums positioned beneath said hood, with one on either side of the open furnace end, the first air plenum having a plurality of holes in facing relationship to said second plenum and said second plenum having a second plurality of facing slots;
   d. means for supplying pressurized air to said first plenum; and
   e. means for connecting said second plenum to said hood first outlet outside said hood.

9. The apparatus of claim 8, further comprising a gas to gas heat exchanger connected to said second effluent gas outlet and to a source of cooling air, said heat exchanger having a cooled effluent gas outlet and a heated air outlet.

10. The apparatus of claim 9, further comprising a particulate filter connected to said heat exchanger cooled effluent gas outlet.

11. The apparatus of claim 10, further comprising means for connecting said particulate filter to said means for connecting said second plenum to said hood first outlet outside said hood.

12. The apparatus of claim 11, further comprising means for connecting said heat exchanger heated air outlet to said furnace.

13. A furnace exhaust and filter system for use in conjunction with an open end rotary furnace, comprising:
   a. a collection hood positioned adjacent the furnace open end in non-contacting relationship;
   b. a first exhaust duct projecting from the collection hood and opening into the furnace interior;
   c. a second exhaust duct connected into the hood and opening above the hood;
   d. first and second air ducts aligned adjacent the furnace open end in facint relationship and beneath said collection hood, one of said air ducts having a plurality of air jet holes and the other duct having a plurality of air receiving openings in facing relationship to said air jet holes;
   e. means for supplying pressurized air to said air duct containing the plurality of air jet holes;
   f. means for connecting said other air duct to said second exhaust duct opening above the hood;
   g. a heat exchanger connected to said first exhaust duct, said heat exchanger having a cooled exhaust outlet; and h. a gas particulate matter filter connected to said heat exchanger cooled exhaust outlet and to said means for connecting said other air duct to said second exhaust duct.

14. The apparatus of claim 13, wherein said heat exchanger further comprises a clean air inlet for receiving air for heat exchanging with said exhaust, and a clean warm air outlet.

15. The apparatus of claim 14, further comprising means for connecting said clean warm air outlet to said furnace.

* * * * *